(12) United States Patent
Taylor et al.

(10) Patent No.: US 8,773,752 B2
(45) Date of Patent: Jul. 8, 2014

(54) NARROW BAND FIBER RAMAN OPTICAL AMPLIFIER

(75) Inventors: Luke R. Taylor, München (DE); Yan Feng, Shanghai (CN); Wolfgang Hackenberg, München (DE); Ronald Holzlöhner, München (DE); Domenico Bonaccini Calia, München (DE)

(73) Assignee: European Organisation for Astronomical Research in the Southern Hemisphere, Munich (DE)

( * ) Notice: Subject to any disclaimer, the term of this patent is extended or adjusted under 35 U.S.C. 154(b) by 783 days.

(21) Appl. No.: 12/812,370

(22) PCT Filed: Jan. 16, 2009

(86) PCT No.: PCT/EP2009/000275
§ 371 (c)(1),
(2), (4) Date: Nov. 3, 2010

(87) PCT Pub. No.: WO2009/090096
PCT Pub. Date: Jul. 23, 2009

(65) Prior Publication Data
US 2011/0038035 A1    Feb. 17, 2011

(30) Foreign Application Priority Data
Jan. 18, 2008 (EP) .................... 08000978

(51) Int. Cl.
*H04B 10/17* (2006.01)
*H01S 3/30* (2006.01)

(52) U.S. Cl.
USPC ........................................ 359/334

(58) Field of Classification Search
USPC ........................................ 359/334
See application file for complete search history.

(56) References Cited

U.S. PATENT DOCUMENTS 6,567,446 B1 * 5/2003 Bacher et al. .......... 372/46.01
6,751,421 B1 * 6/2004 Ranka et al. ............. 398/141
(Continued)

FOREIGN PATENT DOCUMENTS

EP        1 289 078 A2    5/2003
JP     2001-521185 A     10/1998
(Continued)

OTHER PUBLICATIONS

Headley et al. "Methods of Suppressing Stimulated Brillouin Scattering in Optical Fibers by Manipulation of the Fiber Properties", Technical Digest Symposium on Optical fiber Measurements, (Oct. 1, 1996) pp. 105-110.*

(Continued)

*Primary Examiner* — Eric Bolda
(74) *Attorney, Agent, or Firm* — Novak Druce Connolly Bove + Quigg, LLP

(57) ABSTRACT

Optical Raman fiber amplifier (20), with an amplification fiber, wherein at least one section thereof has a ratio of Raman gain coefficient $g_R$ to Brillouin $g_B$ gain coefficient of $g_R/g_B$ larger than 0.001 at the fiber operating temperature and a vacuum wavelength of 1064 nm. The invention further refers to a corresponding light source, the use of a fiber and a method of amplifying light.

37 Claims, 3 Drawing Sheets

(56) References Cited

U.S. PATENT DOCUMENTS

| 7,733,561 B2* | 6/2010 | Mermelstein et al. ........ 359/337 |
| 2004/0246566 A1 | 12/2004 | Miyamoto et al. |

FOREIGN PATENT DOCUMENTS

| JP | 2003-66261 A | 3/2003 |
| JP | 2005-236122 A | 2/2005 |
| JP | 2008-547048 A | 12/2008 |
| WO | WO 99/21053 A1 | 4/1999 |
| WO | WO 2006/138117 A2 | 12/2006 |

OTHER PUBLICATIONS

JP Office Action mailed Aug. 28, 2012 in corresponding JP Application No. 2010-542590, with English translation of relevant portions of Office Action.
"Experimental and Numerical Investigation of the SBS-Threshold Increase in an Optical Fiber by Applying Strain Distributions", J.M. Chavez Boggio, J.D. Marconi, and H.L. Fragnito, Journal of Lightwave Technology, vol. 23, No. 11, Nov. 2005, pp. 3808-3814.
"Suppression of Stimulated Brillouin Scattering in Single-Frequency Multi-Kilowatt Fiber Amplifiers", Joshua E. Rothenberg, Peter A. Thielen, Michael Wickham, and Charles P. Asman, Northrop Grumman Space Technology, One Space Park, R1/1144B, Redondo Beach, CA 90278, Proc of SPIE vol. 6873, pp. 687300-1-687300-7 (Feb. 22, 2008).
International Preliminary Report on Patentability in corresponding PCT/EP2009/000275 mailed Jul. 29, 2010.
European Examination Report in corresponding EP 08 00 0978.
B. Foley, et al., "Gain Saturation in Fiber Raman Amplifiers Due to Simulated Brillouin Scattering", Journal of Lightwave Technology, vol. 7, No. 12, Dec. 1989, pp. 2024-2032.
Office Action mailed Aug. 15, 2011 in corresponding JP Application No. 2010-542590, with English translation of relevant portions of Office Action.
European Search Report in corresponding EP 08 00 0978.
International Search Report in corresponding PCT/EP2009/000275.
Foley B et al., "Gain Saturation in Fiber Raman Amplifiers Due to Stimulated Brillouin Scattering" Journal of Lightwave Technology, IEEE Service Center, New York, NY, US vol. 7, No. 12, Dec. 1, 1989 pp. 2024-2032, XP000103648.
F A Oguama et al. "Measurement of the nonlinear coefficient of telecommunication fibers as a function of Er, Al, and Ge doping profiles by using the photorefractive beam-coupling technique" Journal of the Optical Society of American B (Optical Physics) Opt. Soc. America USA, vol. 22, No. 8, Aug. 1, 2005, XP002485317.
Engelbrecht R et al. "Numerical Calculation of Stimulated Brillouin Scattering and its Suppression in Raman Fiber Amplifiers" Lasers and Electro-Optics Europe, 2003 Cleo/Europe. Jun. 22, 2003, pp. 641-641, XP010712135.
Dougherty D J et al. "Measurement of the Raman Gain Spectrum of Optical Fibers" Optics Letters, OSA, Optical Society of America, Washington, DC, US vol. 20, No. 1, Jan. 1, 1995, pp. 31-33 XP000481039.
EP 1 241 746 A (Europaeische Organisation Fuer [DE]) Sep. 18, 2002, paragraphs [0010], [0021], [0033].
Labudde P et al., "Bandwidth Reduction in CW Fiber Raman Lasers" IEEE Journal of Quantum Electronics, IEEE, Service Center, Piscataway, NJ vol. QE-16, No. 2, Feb. 1, 1980, pp. 115-117, XP000705013.

* cited by examiner

NARROW BAND FIBER RAMAN OPTICAL AMPLIFIER

FIELD OF THE INVENTION

The invention relates to a narrow band fiber Raman optical amplifier.

BACKGROUND

Commonly optical Raman fiber amplifiers are known where light with a pump frequency in an optical fiber amplifies light which corresponds to a Stokes line of the Raman process. The frequency difference between the pump light and the light to be amplified may be typically in the range of 40 nm to 80 nm such as 60 nm.

The Raman process is enhanced e.g. by germanium as an impurity and hence e.g. germanium doped silica fibers are often used for Raman amplifiers. Currently existing Raman amplifiers can reach high powers, but not narrow amplified linewidths at the same time.

Several problems in Raman fiber amplification can be identified. For example, the stimulated Brillouin (SBS) light scattering or Four-Wave mixing (FWM) lead to a linewidth enhancement. This may be undesired for various reasons. A broader linewidth is not favorable for spectroscopic resolution. Further this linewidth broadening usually introduces losses since such light out of a resonant mode or out of a desired wavelength range will be lost.

Raman amplification relies on fiber nonlinearity. This nonlinearity can be described by a tensor of the third level, often referred to as the $X^{(3)}$-tensor (see e.g. G. P. Agrawal, "Nonlinear Fiber Optics", 4$^{th}$ ed., Academic Press, USA). Unfortunately, this nonlinearity also includes other unwanted effects such as four-wave mixing (FWM) and stimulated Brillouin scattering (SBS). The strength of the nonlinearity is commonly characterized by the scalar quantity $$n_2 = \frac{3}{8n}\text{Re}(\chi^{(3)}_{xxxx}), \qquad (1.1)$$

where n is the linear part of the refractive index of the fiber, Re( ) denotes the real part, and xxxx stands for one specific tensor element.

FWM leads to the mixing of different spectral components and induces line broadening. Also, light power at a desired frequency can mix with optical noise and hence signal energy is lost.

Specifically, SBS is a serious detriment in fiber lasers: High laser light intensities create acoustic phonons in the fiber that induce a refractive index grating. The light is backscattered from this grating, an effect which both limits the maximum transmitted power in the fiber and may destroy previous amplifier stages or a seed laser. The onset of SBS happens suddenly when exceeding a certain power level. This power level depends on a number of system parameters such as fiber length, bandwidth of the light, and fiber nonlinearity. In particular, the fiber glass composition, possible glass dopants, and the fiber index profile have a strong influence. In general, SBS will be most severe (start at the lowest power threshold) when using narrowband signals in long, uniform optical fibers. These circumstances have limited the use of Raman amplifiers to either wideband and/or low power applications in the past.

Stimulated Raman amplification (SRS) can be mathematically described as $$\frac{dI_s}{dz} = g_R I_s I_p - \alpha_s I_s, \qquad (0.1)$$

where z is distance along the fiber, $I_s$ denotes the signal intensity, $I_p$ the pump intensity, $g_R$ the Raman gain coefficient, and $\alpha_s$ denotes linear light attenuation. A similar equation holds for SBS:

$$\frac{dI_s}{dz} = g_B I_s I_p - \alpha_s I_s, \qquad (0.2)$$

where $g_B$ is the Brillouin gain coefficient and the first minus sign indicates power loss.

SUMMARY OF THE INVENTION

It is therefore the object of the present invention to provide an optical Raman amplifier, an optical light source and use of an optical fiber and a method for amplifying light by a Raman amplifier which allows for high powers/high amplifications and very narrow linewidths.

According to the invention a fiber with a high ratio between the Raman gain coefficient and the Brillouin gain coefficient is employed. It turned out that for such fibers it is possible to arrive to high powers by Raman amplification without the onset of stimulated Brillouin scattering.

Both SRS and SBS have a threshold-like behavior with onsets above the pump intensities $$I_p^{th,\,SRS} \approx 16 L_{eff} g_R, \quad I_p^{th,\,SBS} \approx 21 L_{eff} g_B, \qquad (0.3)$$

where the effective fiber length $L_{eff}$ is defined as $$L_{eff} = \frac{1 - \exp(-\alpha_p L)}{\alpha_p}, \qquad (0.4)$$

where $a_p$ denotes pump light attenuation and L is fiber length. The onsets $I_p^{th}$ in 1.4 are defined to be the pump intensities which induce the same intensity in the Stokes lines of the Raman or SBS, respectively. It was found to be advantageous for the aim of the present invention to keep the onset ratio $$\frac{I_p^{th,SRS}}{I_p^{th,SBS}} \approx \frac{16}{21}\frac{g_R}{g_B}, \qquad (0.5)$$

as large as possible. The ratio $g_R/g_B$ depends on wavelength, the chemical composition and the geometry of the optical fiber in a complicated way but can be controlled by appropriately choosing those parameters.

Both $g_R$ and $g_B$ depend on wavelength and on the fiber temperature. The SRS coefficient $g_R$ is approximately inversely proportional to the vacuum wavelength $\lambda_0$, while $g_B$ is proportional to $n^7/\lambda_0$, (note that n depends on wavelength as well). In order to properly define the specified ratio its value is defined at an arbitrary vacuum wavelength of 1064 nm. This, however, is only a reference wavelength at which the ratio can be measured. This does not imply that the amplifier can (only) be or shall be used at such wavelength.

The temperature dependence of $g_R$ and $g_B$ is more complicated. The ratio $g_R/g_B$ is specified for the operating temperature which usually is room temperature such as 300K. The amplifier may have a temperature control for the fiber. Here operating temperatures higher or lower than 300 K may be set by such a temperature controller such as e.g. more than 350, 380, 400, 500, 600, 700 or 800 K or even more; or less than 275, 250, 225, 200, 175, 150, 125 or 100 K. In this case the operating temperature where the ratio of $g_R/g_B$ is specified may be different from room temperature. For this purpose the fiber may be e.g. located on a temperature controlled heating or cooling element such as a cylindrical element or may be provided inside a temperature controlled housing.

A fiber with a relative low Raman amplification potential (e.g. given by a low value of $n_2$) may be used such as common fibers used for e.g. long distance telecommunication systems, which are not especially adapted for Raman amplification. Those fibers are chosen, although high powers are desired. The low Raman amplification potential is compensated by relatively high pump powers and relatively long fibers. It turned out that with this particular combination of measures high powers can be obtained and at the same time the linewidth can be maintained narrow.

According to a preferred embodiment, we employ amplification fibers with a low Brillouin gain coefficient $g_B$ such as $g_B < 10^{-10}$ m/W. Since a small value of $g_B$ usually (but not in all fibers) implies a low value of the Raman gain coefficient $g_R$ as well, selecting fibers with small $g_B$ for Raman amplifiers is counter-intuitive to the person skilled in the art.

A possible figure of merit for high-power narrow-band Raman amplifiers is the ratio $B_{FWHM}/P_{out}$ of full spectral width at half maximum (FWHM) intensity signal bandwidth $B_{FWHM}$ to average signal output power $P_{out}$. With the presented technique it is possible to achieve a ratio of $B_{FWHM}/P_{out} < 33$ MHz/W and also of $B_{FWHM}/P_{out} < 10$ MHz/W.

According to preferred embodiments, a combination of measures is used to increase the SBS threshold in the Raman amplifier. These measures include, but are not limited to:
1. Providing fibers with a high ratio $g_R/g_B$ of Raman to SBS gain coefficients (such as more than 0.001, 0.002, 0.005 or 0.01),
2. Providing fibers whose longitudinal acoustic velocity in the core is higher than in the cladding,
3. Providing heating of the fibers differentially, i.e. introducing a temperature gradient along the fiber at least in one section of the fiber,
4. Providing stretching the fibers differentially on e.g. a stretching mandrel, i.e. introduce a stress gradient along the fiber at least in one section,
5. Providing a high-power pump (such as e.g. at least 10, 15, 20, 30, 40 or 50 W optical pump power) to amplify the signal in a fiber as short as possible.
6. Providing a backward pumping scheme (pump light and signal traveling in opposite directions in the fiber),
7. Providing a narrow-band seed laser (less than e.g. 30 MHz spectral bandwidth).
8. Providing the amplifier with multiple stages with optical isolators in between them (an isolator acts like a "light valve" and lets light only pass in the forward direction).
9. Providing different fiber types in different stages,
10. Providing sections of different fiber types together within the same stage, those different types being joined e.g. by splicing,
11. Selecting the lengths of all fibers in the system to optimize gain while maintaining the highest possible SBS threshold.

In particular, reduce the fiber section lengths or fiber length inside different amplification stages towards the output of the amplifier.

In this document, the term "stage" or "amplifier stage" denotes an amplifier fiber portion with its own pump input. In particular, a multi-stage amplifier can have more than one pump input of the same pump light propagation direction, and/or uses at least one isolator between two sections of pumped fiber. The pump light can be recycled between different stages, i.e. unconverted pump light of one stage can be re-injected into another stage.

With respect to the fiber selection, the previous art reports on the use of fiber for Raman amplifiers with high nonlinearities in order to achieve a high magnitude of the Raman gain coefficient (e.g. Z. Yusoff, J. H. Lee, W. Belardi, T. M. Monro, P. C. Teh, and D. J. Richardson, "Raman effects in a highly nonlinear holey fiber: amplification and modulation", Optics Letters, Vol. 27, No. 6, p. 424-426 (2002), or Y. Li, S. D. Jackson, Y. Zhao, S. Fleming, "Simultaneous operation of a Raman fiber amplifier and laser pumped by a dual-wavelength Nd/sup 3+/-doped fiber laser", J. of Lightwave Technology, Vol. 23, Issue 5, p. 1907-1912 (2005)). Such specialty fibers may contain high dopant concentrations and/or very small fiber cores and hence have small mode field diameters, inducing high power densities and thus high nonlinearities. Contrary to this teaching, some aspects of the invention are also based on "non-Raman" fibers, i.e. not specifically favoring Raman conversion, with low dopant concentrations and/or standard core diameters. "Non-Raman fibers" in the scope of this document include single-mode fibers such as Corning SMF-28e fiber that are otherwise used e.g. for telecommunication applications, but not specifically manufactured and/or intended for use in Raman amplifiers.

According to some aspects of the invention, a silica fiber with a nonlinearity coefficient $n_2$ smaller than $5 \times 10^{-20}$ m$^2$/W, $2 \times 10^{-20}$ m$^2$/W, $1 \times 10^{-20}$ m$^2$/W or $0.5 \times 10^{-20}$ m$^2$/W is used for amplification purposes. Although the Raman gain in such silica fibers is rather low, detrimental effects such as SBS and FWM are comparatively low as well. As a result, the light can be amplified without a significant increase in the linewidth, although with low efficiency.

In order to obtain an amplifier, which emits a diffraction limited beam, the fiber for amplification is preferably a single mode fiber. A diffraction limited light beam allows for good projection and good focusing of such beams with corresponding optics.

The fibers are preferably silica fibers. In this document, the term "dopant" denotes an added chemical substance to the fiber glass that alters its optical or acoustic properties. Doping may be intentional or unintentional (e.g., result from contaminations). Typical dopants include, but are not limited to, germanium, aluminium, phosphor, bismuth, magnesium, potassium, fluorine, ytterbium, thulium and boron.

The content of doping materials and, in particular of germanium, is preferably less than 5 weight-%, 2, weight-%, 1 weight-% or even 0.5 weight-%.

Polarization maintaining fibers may be used in order to provide a well defined output polarization and to provide a stable operation of the amplifier.

By providing fibers with a longitudinal acoustic velocity in the core being higher than in the cladding, the concentration of phonons in the core is suppressed such that a higher threshold for SBS is obtained.

Further by introducing inhomogeneities along the fiber e.g. by a temperature gradient, a stress gradient or different fiber types the SBS threshold can be further pushed upwards, since the formation of the phonon caused diffraction grating is hindered. Nevertheless by those measures some linewidth enhancement is caused, which may be acceptable, depending on the desired application. Those measures are favorable in order to use relatively long fibers which are helpful for compensating the low Raman amplification. In case of temperature gradients the operating temperature of the fiber varies along the fiber length. In those cases the term "operating temperature" or the like used in the claims is considered to be given by the highest present fiber temperature.

The fiber laser can emit temporally continuous (continuous wave, cw), temporally modulated, or pulsed light. The quoted powers are always time-averaged over a statistically representative time span.

In case that different fiber types are used, a certain section of a certain fiber type (or two or three or more or all fiber types) is (are) preferably shorter than a previous section in the propagation direction of the signal light. In the downstream section the light intensity will be higher due to the amplification and therefore the SBS threshold be reached at shorter fiber lengths. Therefore along the direction of propagation the fiber sections are preferably getting shorter.

The length of the fiber (e.g. within one amplifier stage) should not be more than 500 m since otherwise, nonlinear effects like stimulated Brillouin light scattering may set on at power levels of several watts.

The inherent loss (in case of no pumping) of the fiber at the operating wavelength is preferably less than 3 db/km. At such low losses a configuration with a low Raman amplification can be realized.

The fiber amplifier is capable of delivering a power amplification of signal power by more than 1 dB, 3, dB, 6 dB, 10 dB, 20 dB or even up to 30 dB.

The amplifier is capable of outputting light with a power of a few Watt (2, 3, 4 or more W), although the linewidth increase may be low.

Even with those relatively large amplifications and/or powers, the linewidth of the output light in comparison to the input light preferably does not increase by more than a factor of 10.

The optical amplifier preferably includes an optical pump source which is arranged in the backward and/or forward pumping scheme. In the backward pumping scheme, the pump light and the light to be amplified travel in opposite directions and in the forward pumping scheme, they travel in the same direction. One or the other or both of the pumping schemes may be used. Pump lasers may even have powers of more than 10, 20, 30, 40 or 50 Watt.

The amplifier has an operating vacuum wavelength within the range of 500-1800 nm. In this range optical fibers are available, which have a low loss such that even with the relatively small gain of undoped fibers or fibers with a low Raman gain coefficient or nonlinearity coefficient it is possible to obtain a net gain (gain due to amplification minus loss).

It is advantageous in order to increase the amplification to use two, three, four or more optical amplification stages. Each of the stages is an optical Raman amplifier according to the above or below-mentioned embodiments. A second or third stage here may still provide an amplification by a factor between 2 and 20. Different amplification stages are preferably separated by optical isolators.

Further in different stages preferably different fiber types are used and in the direction of signal light propagation the fiber length within the different stages preferably becomes shorter from stage to stage at least for one, two, three or more or all stages.

It is to be noted that the amplifier preferably is a "one pass" amplifier. This means that light on the path of amplification is not reflected by e.g. fiber gratings, mirrors or the like. This is to avoid amplification of undesired wavelengths such as light due to stimulated Brillouin light scattering.

The optical light source has the seed light source and an optical amplifier as mentioned beforehand or below for amplifying the light of the seed light source. The seed light source preferably has a single line spectrum with full width at half maximum linewidth between 1 kHz and 300 MHz, depending on the desired final linewidth. Such a light source may e.g. be a fiber laser or a semiconductor laser and/or a DFB (distributed feedback) laser or the like. In case the spectrum of the seed laser comprises more than one spectral peak, the linewidth is considered to be given by the sum of the full width at half maximum bandwidths of all peaks.

The output of the optical light source preferably also has a spectral full width at half maximum linewidth of less than 0.1-30 MHz. In other embodiments, the linewidth can be up to 1000 MHz.

In order to obtain frequency ranges which are not accessible by the fiber amplifier on its own, an optical parametric oscillator or a frequency doubling unit or other frequency changing elements may be provided for changing the frequency of the output light of the optical amplifier.

The output power is possibly more than 0.1-30 Watt. With these powers, high power applications are possible, in particular in view of the case that the fiber is a single mode fiber such that the light can be focused to very narrow spots.

The light output by the amplifier or the frequency conversion preferably is in the visible range. In particular, but not limited to, a yellow wavelength in the vacuum wavelength range of 550-600 nm is preferred.

Whenever in this document it is referred to a "section" or "one section" of the amplification fiber having a particular property it is to be mentioned that also two, three or more sections with this property may be provided or that the entire fiber (of an amplification stage) has this property. Further the sections may be the same section or different sections.

BRIEF DESCRIPTION OF THE DRAWINGS

Preferred embodiments of the present invention are described in the enclosed Figures. Here it is shown in.

DETAILED DESCRIPTION

Figure 1:
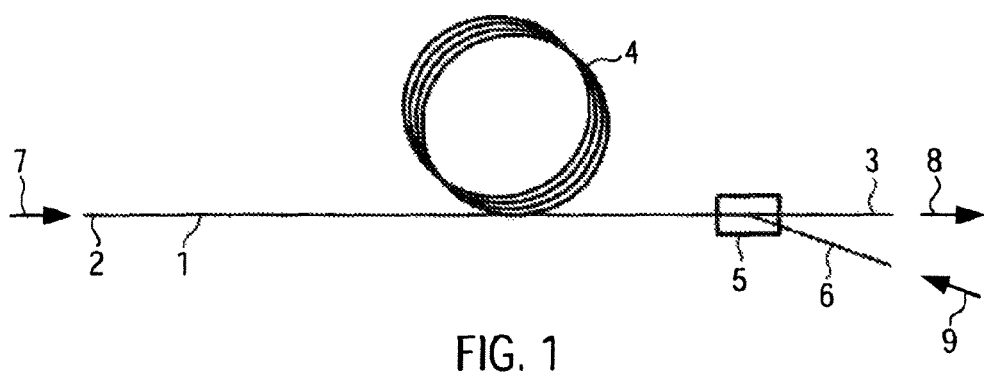
FIG. 1: A fiber amplifier.

In FIG. 1, an optical narrow linewidth Raman amplifier is shown. A silica fiber 1 (here the amplification fiber) is provided with an input end 2 in which input light 7 can be inputted. Further, an output end 3 is provided through which light 8 can be output. Between the input end 2 and the output end 3, the fiber is typically wound up to loops 4 in order to conveniently store the length of the fiber.

The length of the fiber 1 between the ends 2, 3 may be between 1 and 500 m.

Approximate the output end 3, a coupler 5 is provided for coupling pumping light 9 into the silica fiber 1. As can be seen in FIG. 1, here a backward pumping scheme is used. The coupler 5 is a wavelength selective coupler with which pumping light 9 can be coupled from the fiber end 6 into the silica fiber 1. The light which should be amplified and which propagates in the fiber 1, however, is not coupled into the fiber end 6 but is coupled only (or almost only) into the fiber end 3 in order to be output due to its wavelength being different from the one of the pumping light.

The fiber 1 is a fiber that possibly has a nonlinearity coefficient $n_2$ smaller than $5 \times 10^{-20}$ m$^2$/W and/or a Brillouin gain coefficient $g_B$ smaller than $10^{-10}$ m/W. The fiber can also be a polarization maintaining (PM) fiber in order to preserve the polarization state of the light and increase stability.

Figure 2:
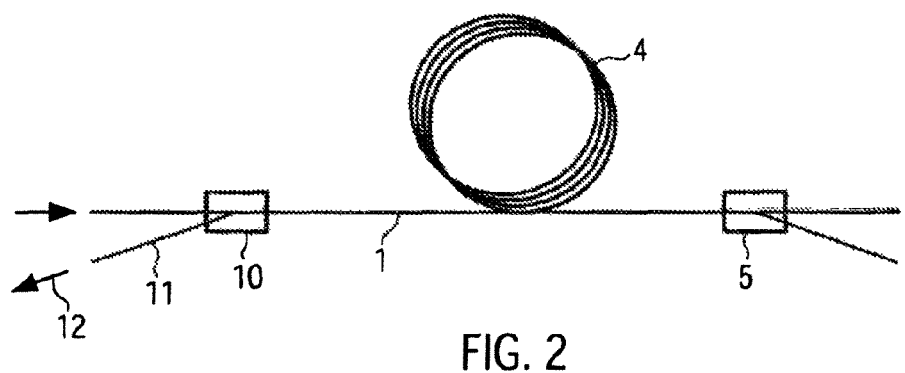
FIG. 2: Another fiber amplifier.

In FIG. 2, a further coupler 10 is provided which is also a wavelength selective coupler. This coupler is able to couple the pump light 9 out of the fiber 1 into the fiber end 11. This coupler 10 is provided in order to avoid light to be output through the input end 2. Such light may disturb a light source which provides input light 7. Optionally, an optical isolator may be used to reduce the amount of back propagating pump or signal light to previous stages or the seed laser.

In other aspects, the amplifier of the FIG. 2 is equal to that of FIG. 1.

Figure 3:
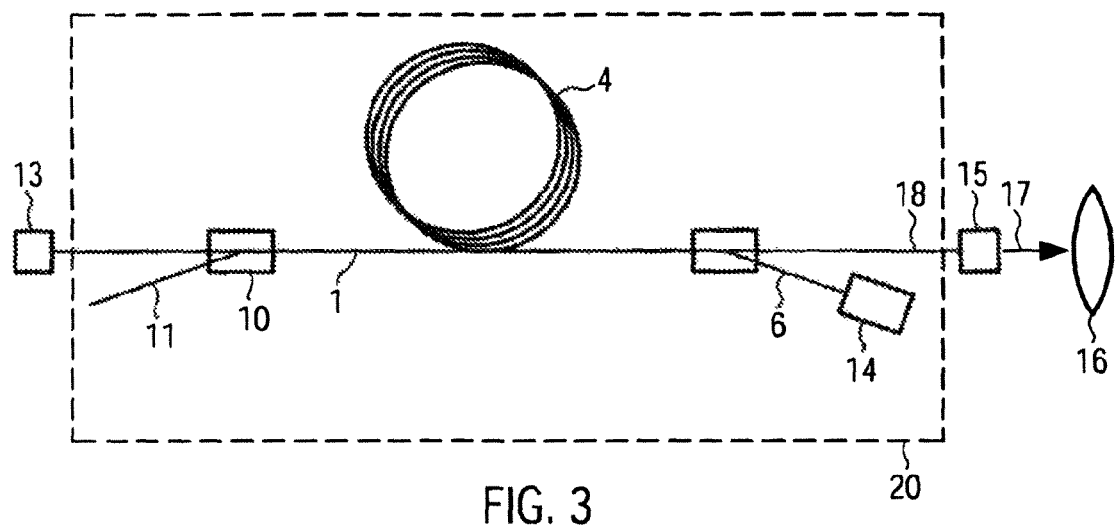
FIG. 3: An optical light source.

In FIG. 3, a light source incorporating the optical amplifier of FIG. 2 is shown. A seed light source 13 is provided which here as an example is a DFB semiconductor laser. Such lasers can provide sufficient light with a very narrow spectral linewidth. The linewidth may be less than 0.1-30 MHz.

In this application example the light output is guided by free space optics to an optional frequency doubling crystal 15. It is e.g. possible to use a periodically poled nonlinear crystal. Light 17 output from this crystal 15 can be further manipulated with corresponding optics 16. It is e.g. possible to expand the beam or to focus the beam depending on the application purposes. It may also be coupled again into a fiber for transmission purposes. Mirrors and/or lenses may be used as such optics 16.

Between the seed light source 13 and the optical Raman fiber amplifier 20, an optical isolator may be provided. This in order to protect the seed light source 13 from the light reflected back into the seed light source.

Further, as can be seen in FIG. 3, a pump light source 14 is used. This may also be a high power semiconductor or fiber laser. Such pump lasers may have powers of more than 10, 20, 30, 40 or 50 Watt.

In the preferred embodiment of the invention, the seed light source 13 is a light source which provides 10 mW at a wavelength of 1178 nm. The pump laser 14 has a power of 40 Watt and provides light at a centre wavelength of 1120 nm. The light 18 output from the amplifier 20 may have a power of 2 to 25 Watt and a linewidth with a full width at half maximum (FWHM) of less than 10 MHz, in some cases less than 500 MHz.

The optical fiber 1 has a length of approximately 1-350 m.

Item 15 in this preferred embodiment is a frequency doubling crystal such that the light output from the crystal 17 has a wavelength of 589 nm. This light corresponds to the yellow emission D-line of sodium. With such light it is therefore possible to excite sodium or carry out spectral analysis with this wavelength. The excitation of sodium can be used for creating an artificial light source in a sodium rich atmosphere layer approximately 90 km above ground. Such an artificial light source can be used for adjusting adaptive optics in astronomy. It can also be created for atomic spectroscopy or for the medical treatment such as treatment of (skin) cancer.

For spectroscopic purposes, the light source 13 may be a tunable light source (with a tunable wavelength). Since the gain of the optical amplifier 20 is provided in a certain wavelength range, output light 18 or the output light 17 can be tuned over a certain wavelength range such as e.g. more than 5, 10 or 20 nm, depending on the pump wavelength.

Figure 4A:
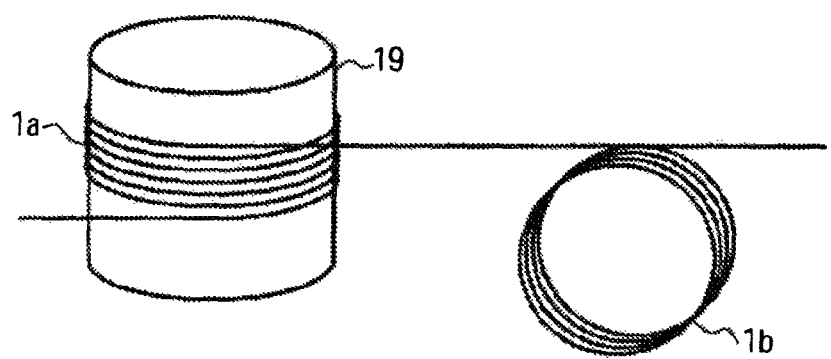
FIG. 4: Embodiments of different fiber sections.

In FIG. 4a section 1a of the amplification fiber 1 is wound under tension around a mandrel 19 in order to induce stress in the fiber. The section 1b is not stressed. Hence the optical and/or acoustical properties of the two fiber sections 1a and 1b are slightly different, which allows to increase the SBS threshold.

In case the fiber section 1a is wound on the mandrel 19 without stress such stress may be induced by preferably (differentially) deforming the mandrel e.g. in case this mandrel being a piezoelectric body which can be deformed by the application of an electrical voltage. If the mandrel is deformed differentially, a tension gradient in the fiber will be included.

The mandrel may also be heated in order to obtain different fiber sections 1a and 1b with different temperatures and thereby causing a temperature gradient in the fiber. This also allows to increase the SBS threshold. Another kind of heating may be used such as a housing in which a section 1a of the fiber is provided.

Figure 4B:
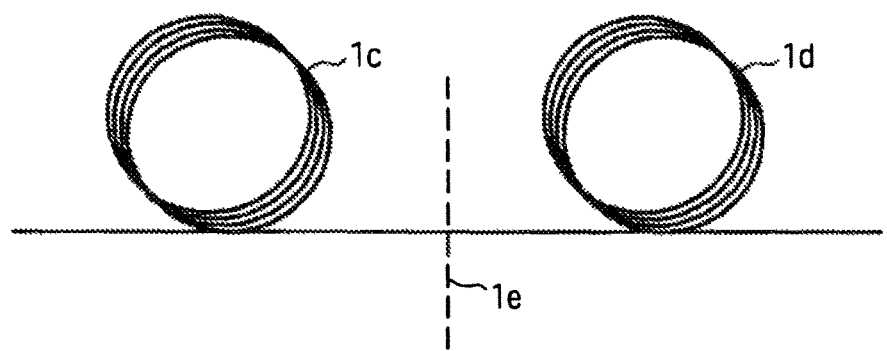

In FIG. 4b a case is shown where the amplification fiber 1 comprises two different types of fiber. One type is indicated with 1c and the other 1d. The fiber sections 1c and 4d can differ in composition, geometry, doping or the like. They are joined at position 1e, preferably by a splice. Instead of two sections, like in FIG. 4b, three or more sections may be used. Further the length of section 1d may by shorter than that of section 1c, assuming that the light to be amplified propagates from left to right. The section 1a in FIG. 4a may be composed of two sections like sections 1c and 1d or three or more sections of different types of fibers. The same applies to section 1b in FIG. 4a. Equally a portion of section 1c and/or 1d may be exposed to stress or elevated or reduced temperature in comparison to other portions as explained for FIG. 4a for the sections 1a and 1b.

Figure 5:
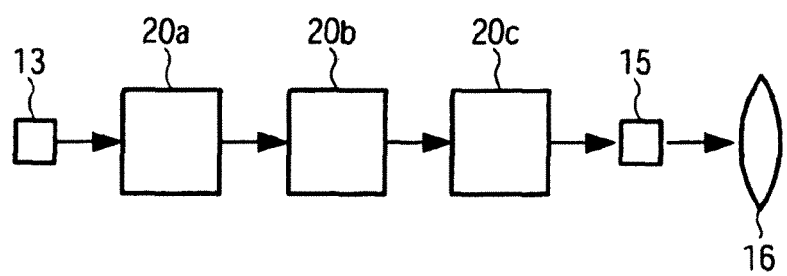
FIG. 5: An optical light source with multi-stage optical amplifier.

In FIG. 5, a preferred embodiment of a multi-stage optical light source is shown. The light source 13 provides light which is amplified in three stages 20a, 20b and 20c. Note that there is no upper limit to the possible number of stages. The light output from the last stage can ultimately be provided to a frequency doubling unit 15 and finally, to an output optics 16.

Optical isolators are preferably provided before and/or after each amplification stage. Here e.g. an optical isolator may be provided before each amplification stage and a one after the last amplification stage.

With this arrangement, powers of up to 30 or 40 Watt are possible and at the same time, having a linewidth of less than 10 MHz, but in some cases up to 1000 MHz.

According to a method of amplifying light, a fiber is selected that has a ratio of $g_R/g_B$ of more than 0.001. This fiber is then used for a Raman optical amplifier wherein this Raman optical amplifier amplifies light in this fiber.

The invention claimed is:

1. Optical Raman fiber amplifier wherein pump light in an optical fiber amplifies a light signal which corresponds to a Stokes Line of a Raman process, comprising
    a pump laser having a power of more than 10 Watt generating the pump light;
    an amplification fiber having a total length of less than 300 m, wherein at least one section thereof has a ratio of Raman gain coefficient $g_R$ to Brillouin $g_B$ gain coefficient of $g_R/g_B$ larger than 0.001 at the fiber operating temperature and a vacuum wavelength of 1064 nm; and
    wherein the Raman gain coefficient is mathematically described as $$\frac{dI_s}{dz} = g_R I_s I_p - \alpha_s I_s,$$

where z is distance along the fiber, $I_S$ denotes the signal intensity, $I_p$ the pump intensity, $g_R$ the Raman gain coefficient, and $\alpha_s$ denotes linear light attenuation, and the Brillouin gain coefficient is mathematically described as $$\frac{dI_s}{dz} = -g_B I_s I_p - \alpha_s I_s,$$

where $g_B$ is the Brillouin gain coefficient and the first minus sign indicates power loss.

2. Optical Raman fiber amplifier according to claim 1, wherein the ratio $g_R/g_B$ is larger than 0.002, 0.005 or 0.01.

3. Optical Raman fiber amplifier according to claim 1, wherein the nonlinearity coefficient $n_2$ of at least one section of the amplification fiber is smaller than $5\times10^{-20}$ m²/Watt, $2\times10^{-20}$ m²/Watt, $1\times10^{-20}$ m²/Watt or $0.5\times10^{-20}$ m²/Watt at the fiber operating temperature and a vacuum wavelength of 1064 nm.

4. Optical Raman fiber amplifier according to claim 1, wherein the Brillouin gain coefficient $g_B$ at least in one section of the fiber is lower than $10^{-10}$ m/W, $0.5\times10^{-10}$ m/W, $0.2\times10^{-10}$ m/W, or $0.1\times10^{-10}$ m/W at the fiber operating temperature and a vacuum wavelength of 1064 nm.

5. Optical Raman fiber amplifier of claim 1, wherein at least one section of the amplification fiber is a single mode fiber.

6. Optical Raman fiber amplifier of claim 1, wherein at least one section of the amplification fiber has a dopant concentration of less than 5 weight-% or 0.5 weight-%.

7. Optical Raman fiber amplifier of claim 1, wherein at least one section of the fiber is a polarization maintaining fiber.

8. Optical Raman fiber amplifier of claim 1, wherein at least one section of the fiber has a longitudinal acoustic velocity in the core higher than in the cladding.

9. Optical Raman fiber amplifier of claim 1, wherein the fiber is heated at different temperatures along the fiber length with a maximum fiber temperature difference of more than 10 Kelvin.

10. Optical Raman fiber amplifier of claim 1, wherein the fiber is stretched such that the local longitudinal stress varies along the fiber length.

11. Optical Raman fiber amplifier of claim 1, wherein the amplification fiber contains more than one different fiber type.

12. Optical Raman fiber amplifier of claim 1, wherein the amplifier is adapted to emit a continuous signal in time or a pulsed signal.

13. Optical Raman fiber amplifier of claim 1, wherein the amplifier includes multiple amplification stages and the total amplification fiber length of at least one stage is at least 10%, 20%, 30% or 50% shorter than the previous stage.

14. Optical Raman fiber amplifier of claim 1, wherein the amplification fiber has a total length of more than a lower limit of 1, 10, 50, 75, 100, 125, 150 or 175 meter and/or less than an upper limit of 100, 125, 150, 175, 200 meter.

15. Optical Raman fiber amplifier of claim 1, wherein the amplification fiber has an intrinsic loss at the operating wavelength of less than 3.0, 2.5, or 2.0 dB/km.

16. Optical Raman fiber amplifier of claim 1, wherein the amplification fiber provides a total gain of more than a lower limit of 1 dB, 3 dB, 6 dB, 10 dB, 20 dB or 30 dB.

17. Optical Raman fiber amplifier of claim 1, wherein the amplifier is capable of emitting more than 2, 3, 4, 5, 8 or 10 Watts of light.

18. Optical Raman fiber amplifier of claim 1, wherein an increase of the linewidth with a full width at half maximum between the input and the output light of less than a factor of 1, 2, 3, 4, 6, 8, 10, 100 or 1000 is provided.

19. Optical Raman fiber amplifier of claim 1, wherein an optical pump source is provided, wherein the pump source is arranged in a backward and/or a forward pumping scheme.

20. Optical Raman fiber amplifier of claim 1, wherein the amplifier has an operating vacuum wavelength in the range of above the lower limit of 500, 600, 700, 800, 900, 1000, 1100, 1200, 1300, 1400 or 1500 nm and/or below an upper limit of 1000, 1100, 1200, 1300, 1400, 1500, 1600, 1700 or 1800 nm.

21. Optical Raman fiber amplifier of claim 1, wherein the amplifier is operable at a vacuum wavelength in the ranges 588-590 nm or 1177-1179 nm.

22. Optical Raman fiber amplifier wherein two, three, four or more optical amplifiers of claim 1 are coupled in series forming an amplifier with multiple amplification stages.

23. Optical Raman fiber amplifier of claim 22, wherein the stages are separated by optical isolators.

24. Optical Raman fiber amplifier of claim 22 wherein the different stages contain different fiber types.

25. Optical Raman fiber amplifier of claim 22, wherein the total amplification fiber length of at lest one stage is at least 10%, 20% or 50% shorter than the previous stage.

26. Optical light source comprising a seed light source and an optical amplifier according to claim 1 for amplifying the light of the seed light source.

27. Optical light source according to claim 26, wherein the seed light source has a linewidth with a FWHM of less than 1 kHz, 5 kHz, 10 kHz, 50 kHz, 100 kHz, 500 KHz, 1 MHz, 5 MHz, 10 MHz, 50 MHz, 100 MHz, 200 MHz, or 300 MHz.

28. Optical light source according to claim 26, wherein the light source has an output linewidth with a FWHM of less than 1, 2, 4, 6, 8, 10, 20, 30, 50, 100, 200, 400, 600, 800 or 1000 MHz.

29. Optical light source according to claim 26, wherein a frequency changing unit is provided for changing frequency of the output light of the optical amplifier.

30. Optical light source according to claim 26, wherein the output power is more than 0.1, 1,2,3,4, 6, 8, 10, 15, 20 or 30 W.

31. Optical light source according to claim 26, wherein the output light has a vacuum wavelength above a lower limit of 450, 475, 500, 525, 550, 575, 585, 600, 625 or 650 nm and/or below an upper limit of 500, 525, 550, 575, 590, 600, 625, 650 or 675 nm.

32. Optical light source according to claim 26, wherein the light source is operable for an output vacuum wavelength in the ranges 588-590 nm or 1177-1179 nm.

33. Optical Raman fiber amplifier according to claim 1, wherein the optical fiber comprises a silica fiber.

34. A method comprising amplifying light by a Raman fiber amplifier wherein pump light in an optical fiber amplifies a light signal which corresponds to a Stokes Line of a Raman process, wherein at least one section thereof has a ratio of Raman gain coefficient $g_R$ to Brillouin $g_B$ gain coefficient of $g_R/g_B$ larger than 0.001 at the fiber operating temperature and a vacuum wavelength of 1064 nm, wherein the amplification fiber has a total length of less than 300 m, and the pump laser has a power of more than 10 W; and wherein the Raman gain coefficient is mathematically described as $$\frac{dI_s}{dz} = g_R I_s I_p - \alpha_s I_s,$$

where z is distance along the fiber, $I_s$ denotes the signal intensity, $I_p$ the pump intensity, the $g_r$ Raman gain coefficient, $\alpha_s$ denotes linear light attenuation, and the Brillouin gain coefficient is mathematically described as $$\frac{dI_s}{dz} = -g_B I_s I_p - \alpha_s I_s,$$

where $g_B$ is the Brillouin coefficient and the first minus sign indicates power loss.

35. Method according to claim 34, where the operating vacuum wavelength is in the ranges 588-590 nm or 1177-1179 nm.

36. Optical Raman fiber amplifier according to claim 1, wherein the optical fiber has inhomogeities along the fiber achieved by temperature gradient, stress gradient or different fiber types.

37. Optical light source according to claim 29, wherein the frequency changing unit is a frequency doubling unit for doubling the frequency of the output light of the optical amplifier.

* * * * *

UNITED STATES PATENT AND TRADEMARK OFFICE
CERTIFICATE OF CORRECTION

PATENT NO. : 8,773,752 B2
APPLICATION NO. : 12/812370
DATED : July 8, 2014
INVENTOR(S) : Taylor et al.

It is certified that error appears in the above-identified patent and that said Letters Patent is hereby corrected as shown below:

In the specification:

In column 2, line 15 (formula 0.2) " $q_B{}^s|_p$ " should be -- $\cdot q_B{}^s|_p$ --.

Signed and Sealed this
Seventh Day of October, 2014

Michelle K. Lee
*Deputy Director of the United States Patent and Trademark Office*